(12) United States Patent
Kashiyama

(10) Patent No.: US 9,400,823 B2
(45) Date of Patent: Jul. 26, 2016

(54) STREAM DATA PROCESSING METHOD ON RECURSIVE QUERY OF GRAPH DATA

(71) Applicant: Toshihiko Kashiyama, Santa Clara, CA (US)

(72) Inventor: Toshihiko Kashiyama, Santa Clara, CA (US)

(73) Assignee: HITACHI, LTD., Tokyo (JP)

( * ) Notice: Subject to any disclaimer, the term of this patent is extended or adjusted under 35 U.S.C. 154(b) by 309 days.

(21) Appl. No.: 13/721,373

(22) Filed: Dec. 20, 2012

(65) Prior Publication Data

US 2014/0181144 A1    Jun. 26, 2014

(51) Int. Cl.
*G06F 17/00* (2006.01)
*G06F 17/30* (2006.01)

(52) U.S. Cl.
CPC ................. *G06F 17/30516* (2013.01)

(58) Field of Classification Search
CPC ................................................ G06F 17/30516
See application file for complete search history.

(56) References Cited

U.S. PATENT DOCUMENTS

| 5,495,600 A | 2/1996 | Terry et al. |
| 7,849,227 B2 * | 12/2010 | Kashiyama et al. ............. 710/1 |
| 8,032,554 B2 * | 10/2011 | Nishizawa et al. ........... 707/781 |
| 8,095,690 B2 * | 1/2012 | Kashiyama et al. ............. 710/1 |
| 8,843,481 B1 * | 9/2014 | Xu .................... G06F 17/30867 707/732 |
| 2006/0124738 A1 * | 6/2006 | Wang et al. ................... 235/385 |
| 2007/0055656 A1 * | 3/2007 | Tunstall-Pedoe . G06F 17/30654 |
| 2009/0248651 A1 * | 10/2009 | Perry ................ G06F 17/30592 |
| 2010/0106946 A1 * | 4/2010 | Imaki et al. .................... 712/220 |
| 2010/0153363 A1 * | 6/2010 | Suzuki et al. ................. 707/720 |

OTHER PUBLICATIONS

Masaru Ganse et al., "Data Stream Processing for Large-scale Bipartile Graph Partitioning" 1959, pp. 1-11, vol. 0, IPSJ Journal ACS.
Miyuru Dayarathna et al., "Hirundo: A Mechanism for Automated Production of Optimized Data Stream Graphs", ICPE 2012, ACM/SPEC 3rd International Conference on Performance Engineering, Apr. 2012, pp. 335-346, Boston, US.
R. Motwani et al., "Query Processing, Resource Management, and Approximation in a Data Stream Management System", In Proc. of the 2003 Conf. on Innovative Data Systems Research (CIDR), (online), Jan. 2003, retrieved on Jan. 19, 2012, Internet URL <https://database.cs.wisc.edu/cidr/cidr2003/program/p22.pdf>.

* cited by examiner

*Primary Examiner* — Tarek Chbouki
(74) *Attorney, Agent, or Firm* — Mattingly & Malur, PC

(57) ABSTRACT

A stream data processing computer comprises: a query execution module to receive an input stream of stream data, manage execution order of operators for executing a query, and output an output stream, the operators including static recursive execution modules, a judge operator, and a dynamic recursive execution module; and a memory including a temporal store to store data generated in executing the query. The static recursive execution modules are configured to conduct a recursive number of static recursive execution of the query. The judge operator is configured to determine whether a preset condition is met after the recursive number of static recursive execution of the query. The dynamic recursive execution module is configured, if the preset condition is not met, to continue execution of the query by dynamic recursive execution from a last result of a last module of the static recursive execution modules, based on a dynamic recursive value.

20 Claims, 19 Drawing Sheets

```
register query q1 istream (
with recursive existPath (origin, target, path, totalhop) as
( select origin, target, origin||'->'||target, 1
  from edge [10 minutes], path [10 minutes]
  where origin = path.origin
  union all
  select in.target, out.target, in.path||'->'||out.target, totalhop+1
  from existPath in, edge [10 minutes] out, path [10 minutes]
  where in.target = out.origin
        and in.origin <> path.target
)
select path, totalhop
from existPath, path [10 minutes], node [10 minutes]
where target = path.target and path.origin = node.nodeId
and path.target = node.nodeId
rank 10 with totalhop desc);
```

Fig. 3 path stream 401

| time | pid | org | tar |
|---|---|---|---|
| 9:04 | 0 | A | P |
| 9:05 | 1 | D | N |
| 9:07 | 2 | B | H |
| 9:08 | 3 | M | Q |

| 9:11 | 4 | A | U | node stream 411

| time | nid | lab |
|---|---|---|
| 9:00 | A | lab1 |
| 9:01 | B | lab2 |
| 9:03 | C | lab3 |
| 9:05 | D | lab4 |
| 9:07 | E | lab5 |

| 9:12 | V | lab21 | edge stream 421

| time | eid | org | tar | wgt |
|---|---|---|---|---|
| 9:01 | 0 | A | B | 3 |
| 9:03 | 1 | A | C | 2 |
| 9:05 | 2 | A | D | 4 |
| 9:07 | 3 | B | E | 4 |
| 9:09 | 4 | B | F | 5 |

| 9:14 | 20 | O | V | 5 |

Fig. 4

Recursive Query Definition Table 501

| query 502 | static recursive 503 | dynamic recursive 504 |
|---|---|---|
| Q1 | 5 | 5 |
| Q2 | 7 | 0 |
| Q3 | 0 | 8 |
| ... | ... | ... |

Judge Condition Definition Table 1201

| query 1202 | method 1203 | condition 1204 |
|---|---|---|
| Q1 | exist | - |
| Q2 | weight | wgt<0.6 |
| Q3 | number | num<3 |
| ... | ... | ... | columns: 1211, 1212, 1213

Fig. 12

Recursive Number Adjusting Definition Table 1601

| Query 1602 | Monitoring Resource 1603 | Monitoring Interval 1604 | Upper Threshold 1605 | Lower Threshold 1606 | Initial Static Recursive 1607 | Adjust Method 1608 | Adjust Value 1609 |
|---|---|---|---|---|---|---|---|
| Q1 | Memory | 10 minutes | 50MB | 30MB | 5 | Amount | 1 |
| Q2 | CPU | 10 minutes | 10% | 5% | 7 | Ratio | 20% |
| Q3 | - | - | - | - | 0 | - | - |
| ... | ... | ... | ... | ... | ... | ... | ... |

Resource Utilization Monitoring Table 1701

| Time 1702 | Query 1703 | Monitoring Resource 1704 | Resource Utilization 1705 | Static Recursive 1706 |
|---|---|---|---|---|
| 9:00 | Q1 | Memory | 55MB | 5 | 1711
| 9:00 | Q2 | CPU | 4% | 7 | 1712
| ... | ... | ... | ... | ... |
| 9:10 | Q1 | Memory | 28MB | 4 | 1713
| 9:10 | Q2 | CPU | 7% | 8 | 1714
| ... | ... | ... | ... | ... |
| 9:20 | Q1 | Memory | 40MB | 5 | 1715
| 9:20 | Q2 | CPU | 6% | 8 | 1716
| ... | ... | ... | ... | ... |

Fig. 17

STREAM DATA PROCESSING METHOD ON RECURSIVE QUERY OF GRAPH DATA

BACKGROUND OF THE INVENTION

The present invention relates generally to computer systems and, more particularly, to stream data processing method on recursive queries of graph data.

Stream data processing is in wide use. There has been an increasing demand for a data processing system which carries out real-time processing for data continuously arriving at a database management system (hereafter, referred to as "DBMS"), which carries out processes for data stored in the storage system. For example, in a system for trading stocks, how fast the system can react to changes in stock prices is one of the most important objects, and a method such as the one carried out by a conventional DBMS, in which stock data is once stored in a storage system and then the stored data is searched for, cannot immediately respond in correspondence with the speed of the changes in stock prices, and may result in losing business chances. For example, though U.S. Pat. No. 5,495,600 discloses a mechanism which issues stored queries periodically, it is difficult to apply this mechanism to the real time data processing for which it is important to execute a query immediately after data such as stock prices is input.

Data which continuously arrives is defined as stream data, and there has been proposed a stream data processing system as a data processing system suitable for the real-time processing for the stream data. For example, R. Motwani, J. Widom, A. Arasu, B. Babcock, S. Babu, M. Datar, G. Manku, C. Olston, J. Rosenstein, and R. Varma: "Query Processing, Resource Management, and Approximation in a Data Stream Management System," Proc. of the 2003 Conf. on Innovative Data Systems Research (CIDR), (online), January 2003, (retrieved on Jan. 19, 2012), Internet URL <https://database.cs.wisc.edu/cidr/cidr2003/program/p22.pdf> discloses a stream data processing system "STREAM."

In the stream data processing system, first, queries are registered to the system, and the queries are executed continuously each time data arrives, which is different from the conventional DBMS. The above-mentioned STREAM employs an idea referred to as sliding window, which partially cuts stream data for efficiently processing the stream data to thereby impart lifetime to the data. As a preferred example of a query description language including a sliding window specification, there is a continuous query language (CQL) disclosed in the R. Motwani et al. reference cited above. The COL includes an extension for specifying the sliding window by using parentheses following a stream name in a FROM clause of a structured query language (SQL), which is widely used for the DBMS. There are two types of typical methods for specifying the sliding window: (1) a method of specifying the number of data rows to be cut, and (2) a method of specifying a time interval containing data rows to be cut. For example, "Rows 50 Preceding" described in the second paragraph of the R. Motwani et al. reference is a preferred example of item (1), in which data corresponding to 50 rows is cut to be processed, and "Range 15 Minutes Preceding" is a preferred example of item (2), in which data for 15 minutes is cut to be processed. In the case of item (1), the data lifetime is defined to be until 50 pieces of data arrive. In the case of item (2), the data lifetime is defined to be 15 minutes. The stream data cut by the sliding window is retained on a memory, and is used for the query processing.

One problem is that graph path search uses a recursive approach. Stream data processing engine has a temporal store which has tentative status of aggregation. On the other hand, when stream data processing engine uses a recursive approach, the processing cost to maintain the tentative status is very high and the required memory space is huge. FIG. 1 shows a sample graph. For example, the path "A→P" is calculated as "A→D→L→M→O→P." Stream data processing engine holds certain period/amount of the graph nodes (10 minutes, 50 nodes, etc.) and graph edges. Graph changes by not only insertion/deletion of nodes/edges but also cutting out from sliding windows. For example, when graph node 103 is newly added, stream data engine can calculate from the temporal store data "A→D→L→M→O." It is the same situation in the case of adding new edge 104, deleting node 105, and deleting edge 106. On the other hand, the engine has to maintain all the temporal stores every time the graph changes.

Miyuru Dayarathna and Toyotaro Suzumura, "Hirundo: A Mechanism for Automated Production of Optimized Data Stream Graphs," ICPE 2012, ACM/SPEC 3rd International Conference on Performance Engineering, 2012/4, Boston, US, to appear, represents a data stream processing method for graph data. However, this method processes graph data by embedded function in the query. US2010/0106946 provides a recursive query method. However, this method does not provide to set recursive number. Some traditional RDBMS (Relational DataBase Management System) have a function to set the number or recursive number. However, such traditional RDBMS only handles a set of data not data streams and does not have a temporal store. As a result, it is difficult to provide a recursive query method for which the maintenance cost is low.

BRIEF SUMMARY OF THE INVENTION

Exemplary embodiments of the invention provide a stream data processing method on recursive queries of graph data. In specific embodiments, the method sets the number of stages of recursive query. A stream data processing engine generates an execution tree and holds tentative aggregation in a temporal store (static recursive execution module). A special operator called "judge operator" in an execution tree judges whether the static recursive execution module generates new results or not. If not, it continues path search in a dynamic recursive execution module. In this way, there is no need to search all of the paths in a graph every time by the static recursive execution module. This approach can decrease maintenance of the temporal store by using the dynamic recursive execution module. It can achieve a balance of both memory space and processing cost.

In accordance with an aspect of the present invention, a stream data processing computer comprises: a processor; a query execution module to receive an input stream of stream data, manage execution order of operators for executing a query, and output an output stream of stream data, the operators including static recursive execution modules, a judge operator, and a dynamic recursive execution module; and a memory including a temporal store to store data generated in executing the query. The static recursive execution modules are configured to conduct a recursive number of static recursive execution of the query. The judge operator is configured to determine whether a preset condition is met after the recursive number of static recursive execution of the query. The dynamic recursive execution module is configured, if the preset condition is not met, to continue execution of the query by dynamic recursive execution from a last result of a last static recursive execution module of the static recursive execution modules, based on a dynamic recursive value.

In some embodiments, the preset condition is met if the static recursive execution modules generate a new result after the recursive number of static recursive execution of the query. The judge operator is configured to determine whether the static recursive execution modules generate a new result after the recursive number of static recursive execution of the query. The dynamic recursive execution module is configured, if the new result is not generated, to continue execution of the query by dynamic recursive execution from the last result of the last static recursive execution module of the static recursive execution modules, for a recursive times equal to the dynamic recursive value.

In specific embodiments, a query parser calls a static recursive query generating module in the memory to generate a number of the static recursive execution modules corresponding to the recursive number of static recursive execution of the query, a judge operator generating module in the memory to generate the judge operator; and a dynamic recursive query generating module in the memory to generate the dynamic recursive execution module, in an execution tree. The query parser is configured to generate, based on the input stream and by parsing the query, the execution tree which includes an input tuple set of multiple streams. The operators include sliding window operators each cutting out data rows from the multiple streams by specifying a time interval for cutting out data rows. The static recursive execution modules are placed after the sliding window operators for the multiple streams. The judge operator is placed after the last static recursive execution module. The dynamic recursive execution module is placed after the judge operator.

In some embodiments, the dynamic recursive execution module includes a recursive times judge to judge whether to perform a recursive number of dynamic recursive execution of the query from the last result of the last static recursive execution module, based on the dynamic recursive value and a recursive times of dynamic recursive execution. The preset condition relates to at least one of path weight or path number. The recursive number of static recursive execution of the query and the dynamic recursive value are preset. The stream data processing computer further comprises: a resource utilization monitoring module to monitor resource utilization of the stream data processing computer; and a recursive number adjusting module to change at least one of the recursive number of static recursive execution of the query or the dynamic recursive value, based on the monitored resource utilization.

In specific embodiments, the stream data processing computer further comprises a recursive number adjust setting module to update a recursive number adjusting definition table based on a recursive number adjust setting command. The resource utilization monitoring module is configured to monitor resource utilization of the stream data processing computer based on the recursive number adjusting definition table. The recursive number adjusting module is configured to change at least one of the recursive number of static recursive execution of the query or the dynamic recursive value, based on the monitored resource utilization and the recursive number adjusting definition table.

Another aspect of the invention is directed to a non-transitory computer-readable storage medium storing a plurality of instructions for controlling a data processor to perform stream data processing that receives stream data input information as primary information and generates secondary information by acquiring primary information within a predetermined period from among the received primary information, in a stream data processing computer which includes a memory having a temporal store. The plurality of instructions comprise: instructions that cause the data processor to receive an input stream of stream data, manage execution order of operators for executing a query, and output an output stream of stream data, the operators including static recursive execution modules, a judge operator, and a dynamic recursive execution module; instructions that cause the data processor to store in the temporal store data generated in executing the query; instructions that cause the static recursive execution modules to conduct a recursive number of static recursive execution of the query; instructions that cause the judge operator to determine whether a preset condition is met after the recursive number of static recursive execution of the query; and instructions that cause the dynamic recursive execution module, if the preset condition is not met, to continue execution of the query by dynamic recursive execution from a last result of a last static recursive execution module of the static recursive execution modules, based on a dynamic recursive value.

These and other features and advantages of the present invention will become apparent to those of ordinary skill in the art in view of the following detailed description of the specific embodiments.

BRIEF DESCRIPTION OF THE DRAWINGS

FIG. 3 shows an example of a query.

FIG. 4 shows an example of stream data.

FIG. 5 shows an example of a recursive query definition table.

FIG. 12 shows an example of a judge condition definition table.

FIG. 16 shows an example of a recursive number adjusting definition table.

FIG. 17 shows an example of a resource utilization monitoring table.

DETAILED DESCRIPTION OF THE INVENTION

Figure 1:
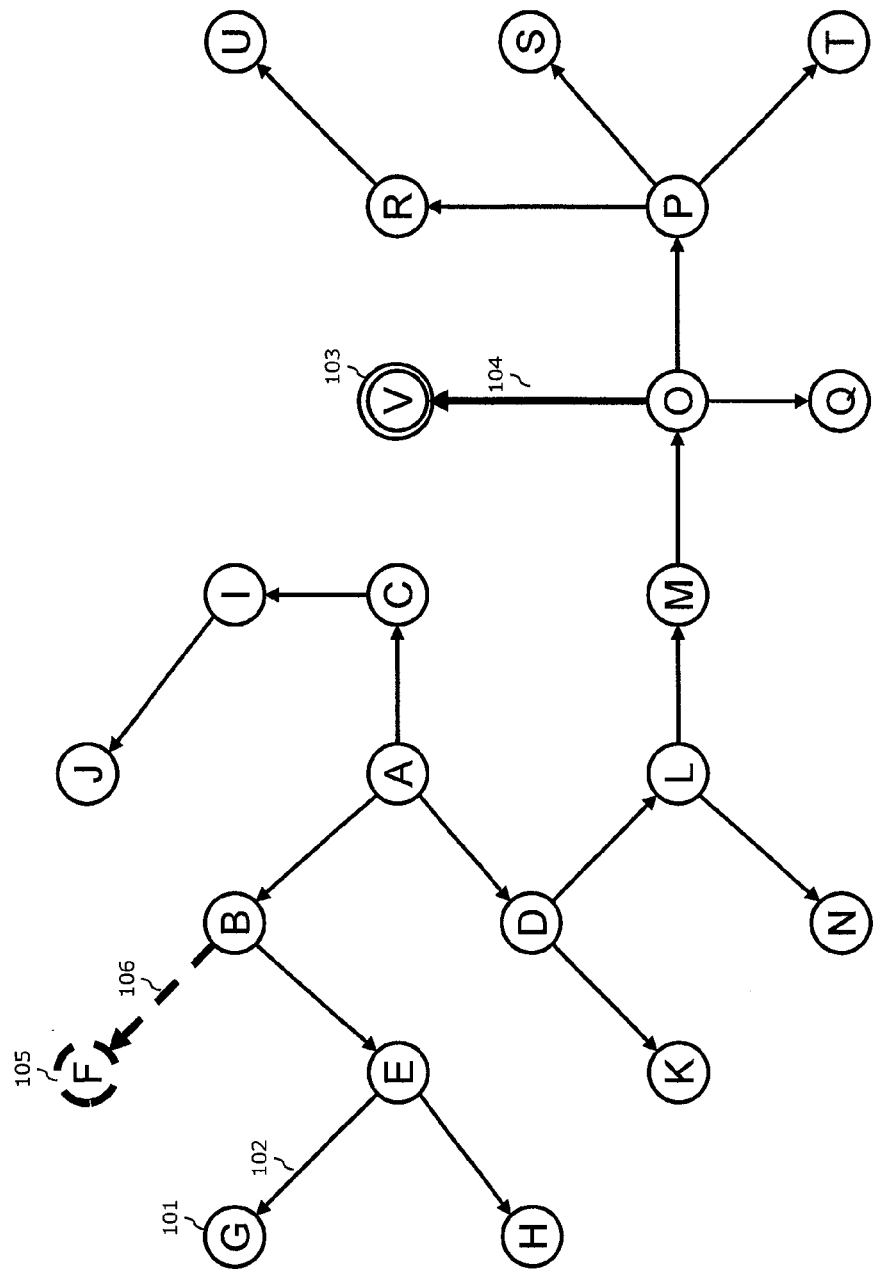
FIG. 1 shows a sample graph.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment," "this embodiment," or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium including non-transient medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for stream data processing method on recursive queries of graph data.

First Embodiment

Figure 2:
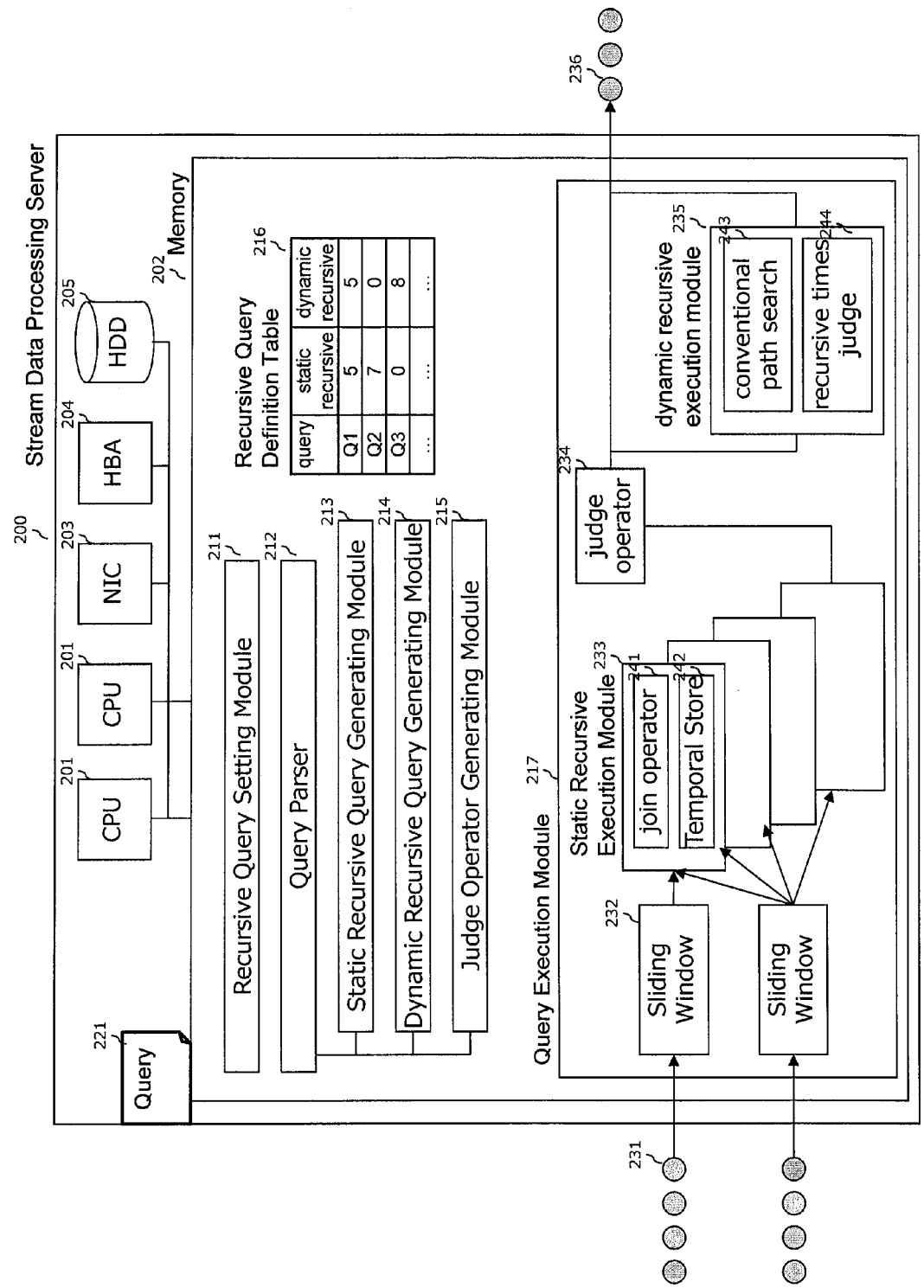
FIG. 2 shows an example of a stream data processing server 200 according to a first embodiment of the present invention.

FIG. 2 shows an example of a stream data processing server 200 according to a first embodiment of the present invention. It has CPU 201, memory 202, NIC (Network Interface Card) 203, HBA (Host Bus Adapter) 204, and HDD (Hard Disk Drive) 205. The memory 202 stores recursive query setting module 211, query parser 212, static recursive query generating module 213, dynamic recursive query generating module 214, judge operator generating module 215, recursive query definition table 216, and query execution module 217. The query execution module 217 includes sliding window 232, static recursive execution module 233, judge operator 234, and dynamic recursive execution module 235 which has conventional path search 243 and recursive times judge 244.

Figure 6:
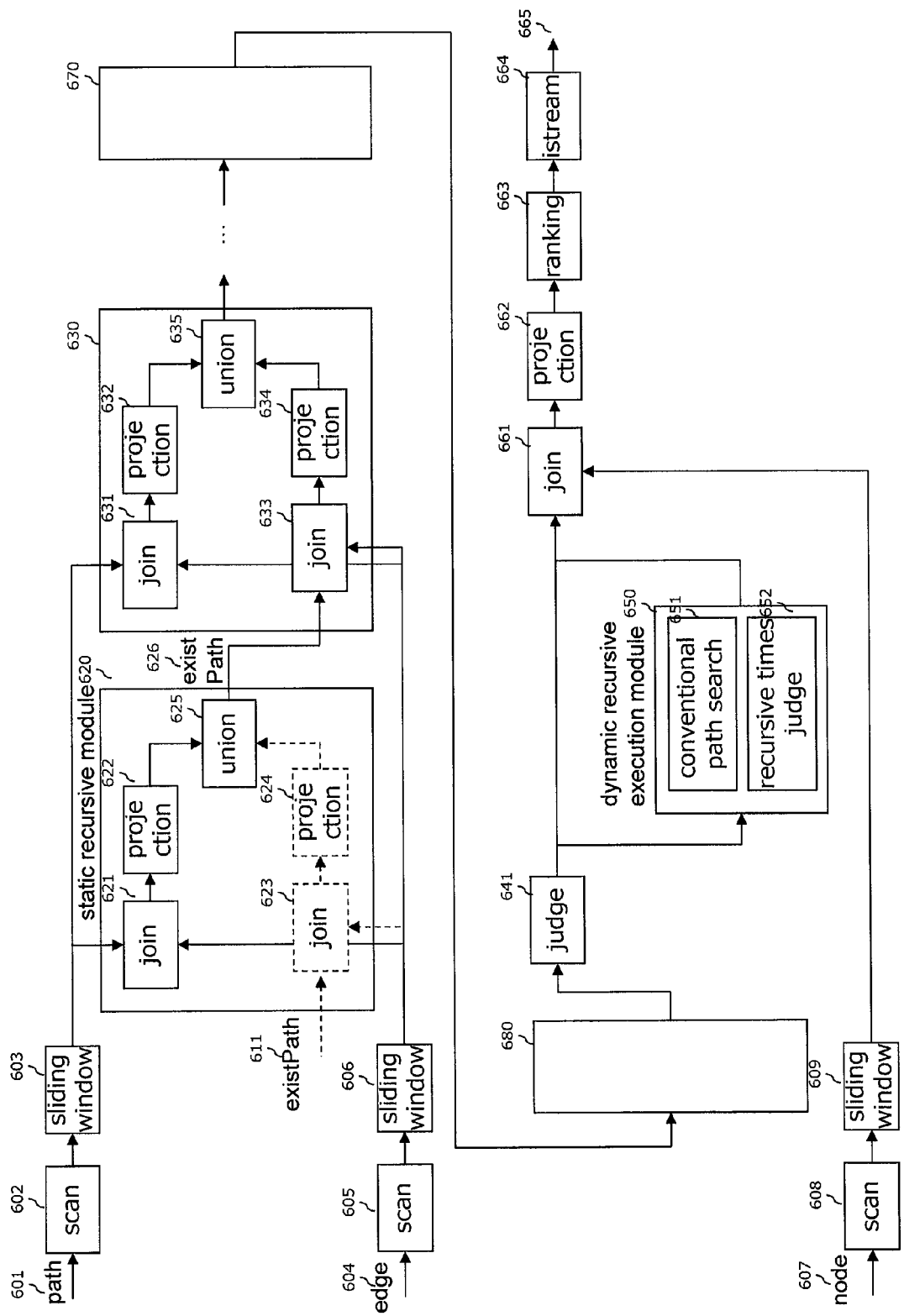
FIG. 6 shows an example of a process flow of the query execution module when the query is parsed.
Figure 7:
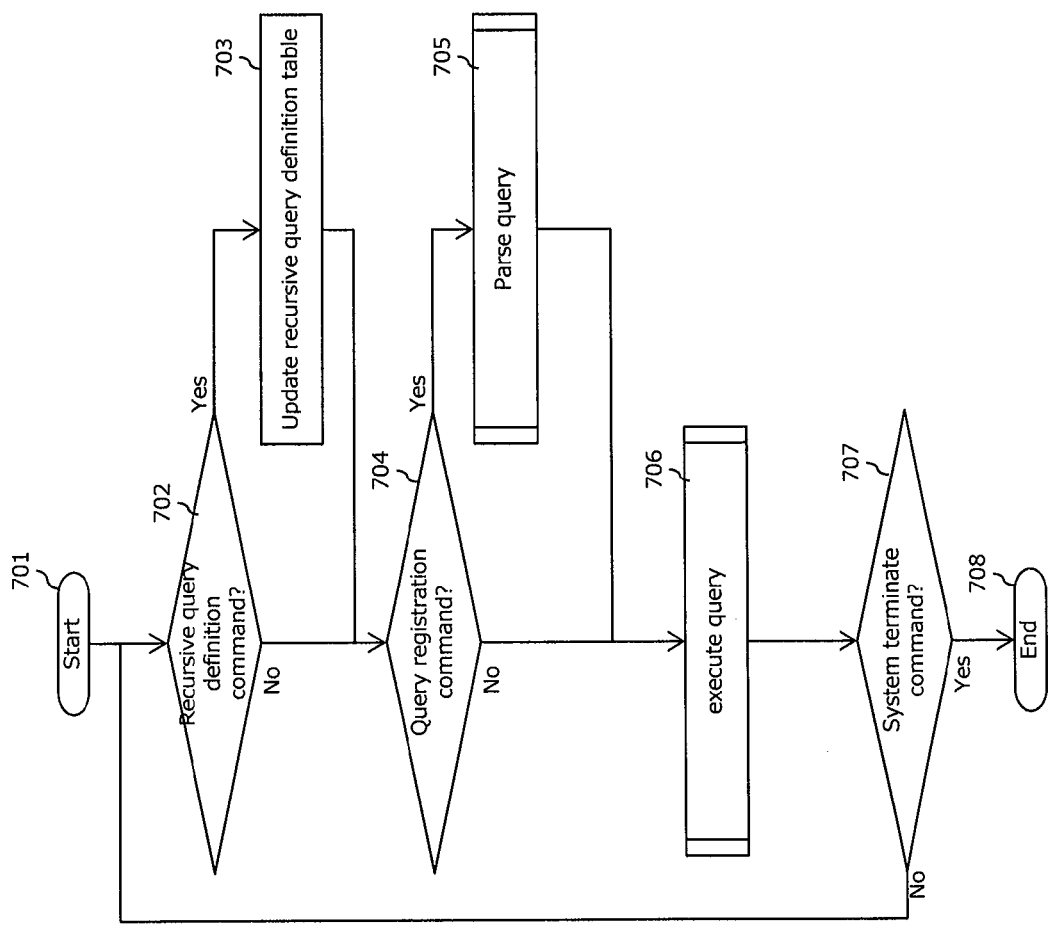
FIG. 7 shows an example of a flow diagram illustrating an overall process performed in the stream data processing system of FIG. 2 according to the first embodiment.

The recursive query setting module 211 receives recursive query definition command and update recursive query definition table 216 (see FIG. 5 and FIG. 7). The query parser 212 parses a query 221 (see FIG. 3) and generates the query execution module 217 (see FIG. 8). The static recursive query generating module 213 generates the static recursive execution module 233 from the query 221 (see FIG. 8, steps 804-806). The dynamic recursive query generating module 214 generates the dynamic recursive execution module 235 from the query 221 (see FIG. 8, step 808). The judge operator generating module 215 generates the judge operator 234 from the query 221 (see FIG. 8, step 807). The recursive query definition table 216 manages the recursive number (static recursive/dynamic recursive) in each query (see FIG. 5). The query execution module 217 includes multiple operators such as sliding window sliding window 232, static recursive execution module 233 which has join operator 241 and temporal store 242, judge operator 234, and dynamic recursive execution module 235 which has conventional path search 243 and recursive times judge 244. The operators are connected with a queue. The query execution module 217 manages the execution order of operators by some job scheduling algorithms (round robin, leaf to root in execution tree, etc.), and receives input stream 231 (see FIG. 4) and outputs output stream 236 (see FIG. 6).

There are two types of typical methods for specifying the sliding window 232: (1) a method of specifying the number of data rows to be cut, and (2) a method of specifying a time interval containing data rows to be cut. The static recursive execution module 233 is related to a static recursive module 620 in FIG. 6, and has multiple operators such as join and projection. This module is a stream data processing engine that generates an execution tree and holds tentative aggregation in the temporal store 242. A special operator called the "judge operator" 234 in an execution tree judges whether the static recursive execution module 233 generates new results or not. The judge operator 234 is related to a judge operator 641 in FIG. 6, and refers to the recursive query definition table 216. The dynamic recursive execution module 235 is related to the judge 631 in FIG. 6. If the judge operator 234 judges that the static recursive execution module 233 does not generate new results, the dynamic recursive execution module 235 continues the path search from the last result of static recursive execution module 233. The join operator 241 combines multiple streams and holds the combined result in the temporal store 242. The temporal store 242 holds tentative aggregation data or combined result of the join operator 241. The conventional path search 243 executes conventional path search. The recursive times judge 244 judges whether there is recursive number of dynamic recursive execution module and refers to the recursive query definition table 216.

FIG. 3 shows an example of a query. The query name is Q1 (register query Q1). The query holds tuples of a stream named edge within a range of past ten minutes (FROM edge [Range 10 minute]), holds tuples of a stream named path within a range of past ten minutes (FROM path [Range 10 minute]), and holds tuples of a stream named node within a range of past ten minutes (FROM node [Range 10 minute]). There is recursive execution of "With recursive . . . " part as a function of origin, target, path and totalhop (with recursive existPath (origin, target, path, totalhop) as (select . . . )): Join edge and path in a condition "origin=path.origin" (where origin=path.origin); Extract multiple columns "origin, target, origin||'→'||target, 1" from joining result (select origin, target, origin||'→'||target, 1); Union the former query results and the latter query results (select origin . . . union all select in. target . . . ); Extract multiple columns "in.target, out.target, in.path||'→'||out.target, totalhop+1" from joining result (select in.target, out.target, in.path||'→'||out.target, totalhop+1); Join existPath and edge in a condition "in.target=out.origin and join existPath and path in a condition "in.origin< >path. target" (where in.target—out.origin and in.origin< >path.target). The query extracts multiple columns "path and totalhop" (select path, totalhop), joins existPath and path in a condition "target=path.target" and join path and node in conditions "path.origin=node.nodeid and path.target=node.nodeid), calculates top 10 ranking in totalhop as order of descendent, and outputs only new result by new data input (istream ( . . . );.

FIG. 4 shows an example of stream data. A path stream 401 indicates path information to search, and includes time column "time" 402, path id column "pid" 403, origin column "org" 404, and target column "tar" 405. There are sample entries 406, 407. A node stream 411 indicates node information in graph, and includes time column "time" 412, node id column "nid" 413, and label column "lab" 414. There are sample entries 415, 416. At the time of 9:10, 5 data which nid is "A, S, C, D, E" are in 10-minutes sliding window. When entry 416 is input, entry 415 will disappear from the window. An edge stream 412 indicates edge information in graph, and includes time column "time" 422, edge id column "eid" 423, origin column "org" 424, target column "tar" 425, and weight column "wgt" 426. There are sample entries 427, 428.

FIG. 5 shows an example of a recursive query definition table 501. The table manages recursive query number in each query. It has query column 502 which indicates query name, static recursive column 503 which indicates the recursive number of static recursive module 233, and dynamic recursive column. There are sample entries 511-513. Entry 511, for example, indicates that the query execution module 217 has 5 stages of static recursive execution module 233 and another 5-hop search in dynamic recursive execution module 235 in query Q1.

FIG. 6 shows an example of a process flow of the query execution module 217 when the query 221 is parsed. This execution tree is generated by the query parser 212. The query execution module 217 is constituted of operators each serving as an execution module for performing a processing and queues connecting the operators with each other. In FIG. 6, the left end indicates an input side, and the right end indicates an output side. As an input tuple, the path stream 601, edge stream 604, and node stream 607 are input. The processing result of the query of the query execution module 217 is output as the real-time output result 665. The operators vary in type depending on their processing contents. Execution order of operators is managed by some job scheduling algorithms (round-robin, leaf to root in execution tree, etc.). Scan operators 602, 605, and 608 add a timestamp to an input tuple 601, 604, and 607, respectively. Sliding window operators 603, 606, and 609 cut out data rows from the stream data 601, 604, and 607, by specifying a time interval for cutting out data rows, and perform a processing of converting the stream data 601, 604, and 607 into a tuple set, respectively (from path [range 10 minute], from edge [range 10 minute], and from node [range 10 minute)). Projection operators 622, 624, 632, 634, and 662 perform a processing of outputting only a portion of the columns ("select origin, target, origin||'→<'||target, 1," "select path, totalhop," etc.). Join operators 621, 623, 631, 633, 661 perform a processing of joining two or more stream data under a given condition ("where origin=path.origin," "where target=path.target," etc.). The join operator 241 has the temporal store 242 to hold tentative combined result. Union operators 625 and 635 merge both outputs of projections 622, 632 and outputs of projections 624, 634, respectively ("select . . . union all select . . . ").

Static recursive modules 620 and 630 include elements 621-625, 631-635, respectively ("with recursive existPath (origin, target, path, totalhop) as (select . . . )"). The number of static recursive modules is defined in the recursive query definition table 501 shown in FIG. 5. A judge operator 641 is a special operator which judges whether the static recursive execution module 233 generates new results or not. If not, continue path search in dynamic recursive execution module 235. The judge operator 641 in FIG. 6 is the same as the judge operator 234 in FIG. 2. A dynamic recursive module 650 executes conventional path search 651 from the last result of the static recursive execution module 233. The conventional path search 651 in FIG. 6 is same as the conventional path search 243 in FIG. 2. The recursive times judge 652 is the same as the recursive times judge 244 in FIG. 2.

A ranking operator 663 calculates ranking in a specific column (or multiple columns) ("rank 10 with totalhop desc"). A streaming operator 664 performs a processing of converting the tuple set into the stream data ("istream ( . . . )"). In addition to the operators shown in FIG. 6, there are a filter operator which performs a processing of determining whether or not the tuples are output based on predetermined conditions, and an aggregation operator which performs an aggregation processing represented by derivation of a sum, an average, a maximum, a minimum, a count, a variance, a standard deviation, a median, or the like, and other such operators.

Figure 8:
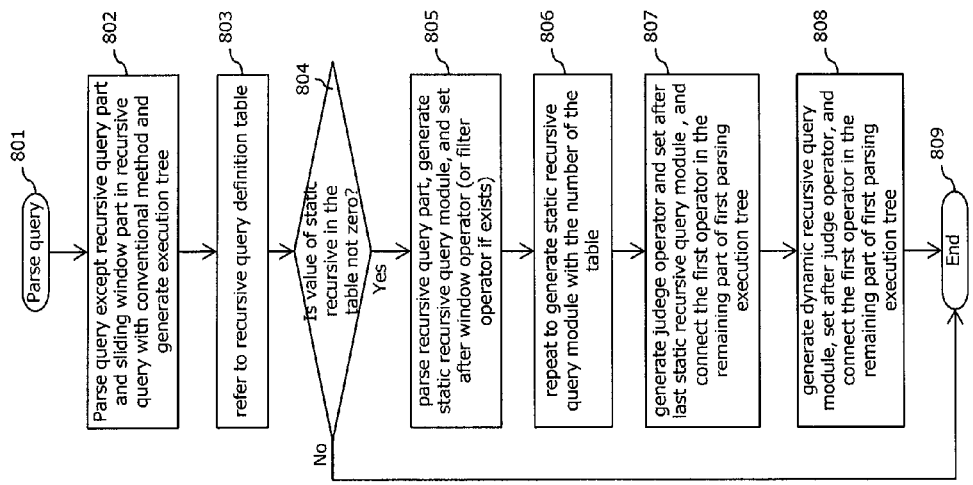
FIG. 8 shows an example of a flow diagram illustrating the process of Step 705 of parsing query in FIG. 7.
Figure 9:
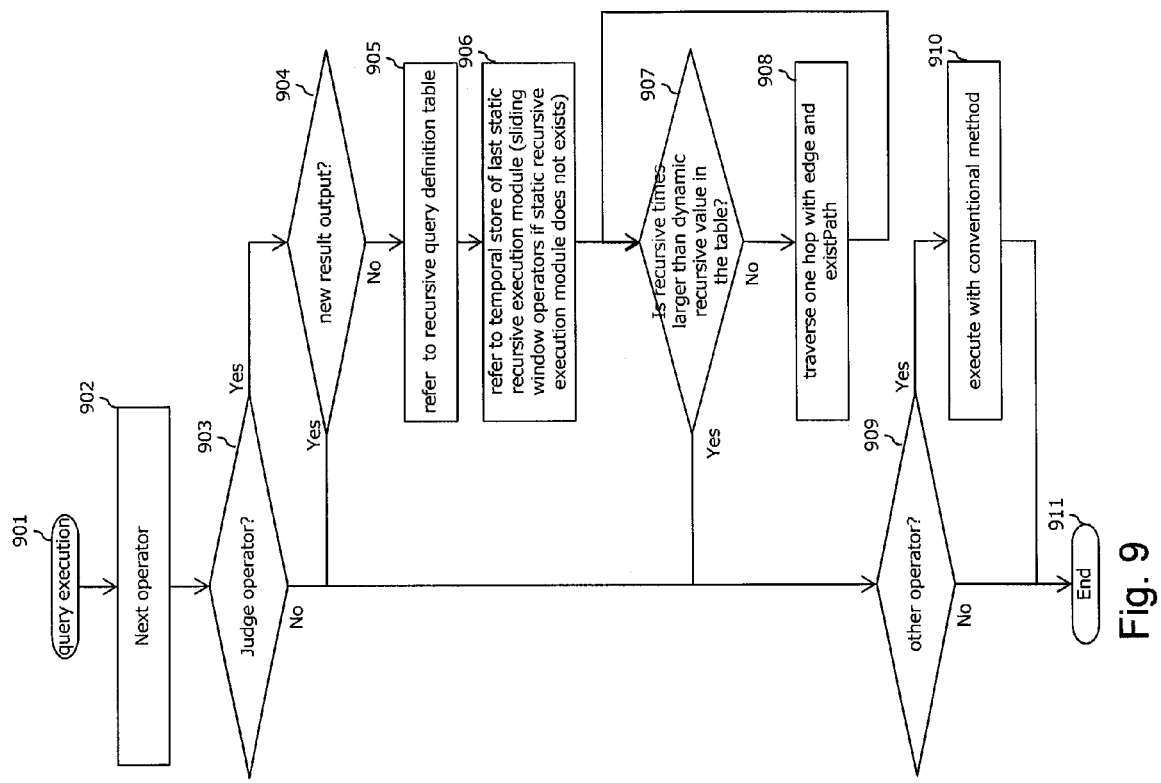
FIG. 9 shows an example of a flow diagram illustrating Step 706 for executing query in FIG. 7 according to the first embodiment.

FIG. 7 shows an example of a flow diagram illustrating an overall process performed in the stream data processing system 200 of FIG. 2 according to the first embodiment. It starts at step 701. The recursive query setting module 211 determines whether or not an input command is a recursive query definition command (Step 702). If "YES" is determined in Step 702, the recursive query setting module 211 updates the recursive query definition table 216 (Step 703). If "NO" is determined in Step 702, the query parser 212 determines whether or not an input command is a query registration command (Step 704). If "YES" is determined in Step 704, the query parser 212 parses the query (Step 705). Details of Step 705 are shown in FIG. 8. If "NO" is determined in Step 704, the query execution module 217 executes the query (Step 706). Details of Step 706 are shown in FIG. 9. Then the query parser 212 determines whether or not an input command is a system terminate command (Step 707). If "YES" is determined in Step 707, the process ends (Step 708). If "NO" is determined in Step 707, the procedure returns to Step 702.

FIG. 8 shows an example of a flow diagram illustrating the process of Step 705 of parsing query in FIG. 7. First, the query parser 212 parses the query except the recursive query part and sliding window part in recursive query with the conventional method and generates an execution tree in the query execution module 217 (Step 802). The query parser 212 refers to the recursive query definition table 216 (Step 803). The static recursive query generating module 213 determines whether or not the value of static recursive in the recursive query definition table 216 is not zero (Step 804). If "YES" is determined in Step 804 (i.e., not zero), the query parser 212 parses the recursive query part and generates one static recursive execution module 233. Then the static recursive execution module 233 is set after sliding window operator 232 (or filter operator if exists) (Step 805). The static recursive query generating module 213 repeats its process to generate the static recursive execution module with the number of the table (Step 806). The judge operator generating module 215 generates judge operator 234, sets after the last static recursive execution module, and connects with the first operator in the remaining part of first parsing execution tree (Step 807). The dynamic recursive query generating module 214 generates the dynamic recursive execution module 235, sets after the judge operator 234, and connects the first operator in the remaining part of the first parsing execution tree (Step 808). After Step 808 or If "NO" is determined in Step 804, the process ends (Step 809).

As an example of the process of FIG. 8, the query 301 shown in FIG. 3 is registered. In Step 802, the query parser 212 generates elements 601-609, and elements 661-665 in FIG. 6. In Step 803, the query parser 212 refers to row 511 in the recursive query definition table 501 in FIG. 5. In Step 804, the static recursive query generating module 213 determines "YES" because the value of static recursive is 5. In Step 805, the static recursive query generating module 213 generates the static recursive module 620 which has elements 611 and 621-626, and sets after elements 603 and 606 which are sliding window operators. Note that the first static recursive module 602 does not include existPath 611, join operator 623, and projection 624 because existPath 611 does not exist first. In Step 806, the static recursive query generating module 213 generates the remaining 4 (total number is 5 with 1 module already generated) static recursive modules 630, 670, and 680. In Step 807, the judge operator generating module 215 generates the judge operator 641, sets after element 680 which is the last static recursive module, and connects with the join operator 661 which is the first operator in the remaining part of the first parsing execution tree. In Step 808, the dynamic recursive query generating module 214 generates the dynamic recursive module 650 and connects with the join operator 661 which is the first operator in the remaining part of the first parsing execution tree.

FIG. 9 shows an example of a flow diagram illustrating Step 706 for executing query in FIG. 7 according to the first embodiment. First, the query execution module 217 determines next operator to execute (Step 902). The query execution module 217 manages execution order of operators by some job scheduling algorithms (round-robin, leaf to root in execution tree, etc.). The query execution module 217 determines whether or not the next operator is a judge operator (Step 903). If "YES" is determined in Step 903, the judge operator 641 in FIG. 6 determines whether or not new results are output from element 680 which is the last static recursive module (Step 904). If "NO" is determined in Step 904, the dynamic recursive module 650 refers to the recursive query definition table 216 (Step 905). The dynamic recursive module 650 refers to the temporal store of the last static recursive module 680 (or sliding window data if static recursive execution module does not exist) (Step 906). The recursive times judge 652 of the dynamic recursive module 650 determines whether or not the recursive times, which is the number of traversing (e.g., number of hops), is larger than a dynamic recursive value in the recursive query definition table 216 (Step 907). If "NO" is determined in Step 907, the conventional path search 651 of the dynamic recursive module 650 traverses one hop with edge and existPath (Step 908). If "YES" is determined in Step 904 or if "YES" is determined in Step 907, the query execution module 217 determines whether or not the next operator is some operator other than the judge operator (Step 909). If "Yes" is determined in Step 909, an operator executes with the conventional method (Step 910). After Step 910 or if "No" is determined in Step 909, the process ends (Step 911).

Figure 10:
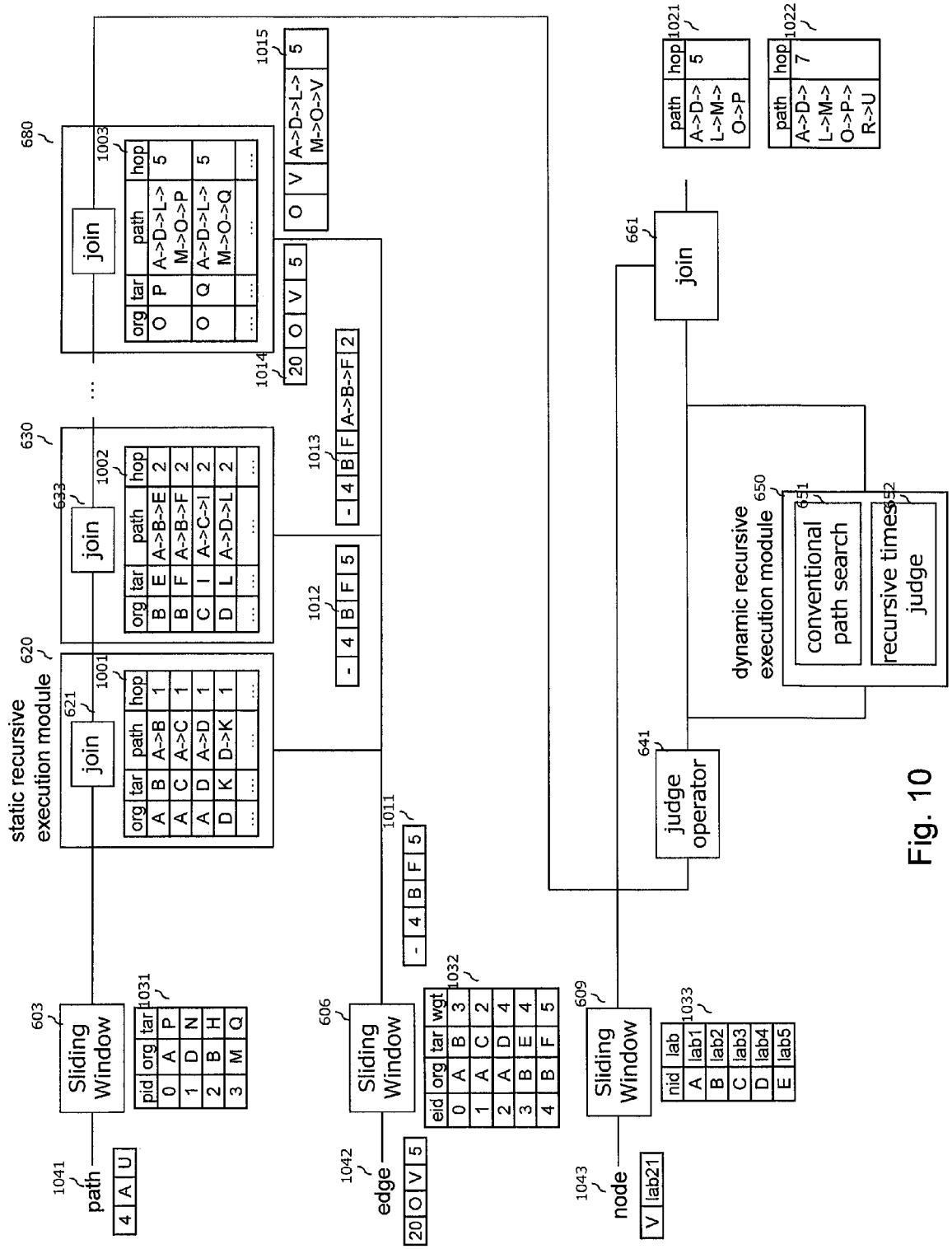
FIG. 10 shows an execution example of FIG. 9.

FIG. 10 shows an execution example of FIG. 9. It simplifies the execution tree shown in FIG. 6. The path stream 401, edge stream 411, and node stream 421 are shown in FIG. 4. In the case of 9:09, the sliding window 603 holds 10-minutes data 1031 in the temporal store. Likewise, the sliding window 606 holds data 1032, and the sliding window 609 holds data 1033. The static recursive modules 620, 630, and 680 hold temporal store 1001, 1002, and 1003, respectively.

In the example of FIG. 9 and FIG. 10, path "0, A, P" is calculated as follows. The temporal store 1001 holds a path "A, B, A→B, 1," the temporal store 1002 holds a path "B, E, A→B→E, 2," and the temporal store 1003 holds a path "O, P, A→D→L→M→O→P, 5." The judge operator 641 determines "YES" in Step 904. Finally, output data 1021 "A→D→L→M→O→P, 5" is output.

As a second example, in the case of adding path 1041, the temporal store data 1001, 1002, and 1003 are calculated in the same manner. The judge operator 641 determines "NO" in Step 904 because temporal store data 1003 only has a path "O, P, A→D→L→M→O→P, 5" and it is a different path from the added path 1041. In Step 905, the dynamic recursive module 650 refers to the recursive query definition table 216. The recursive query definition table 501 in FIG. 5 shows the value of dynamic recursive in Q1 is 5. In Step 906, the dynamic recursive module 650 refers to the temporal store data 1003 which is in the last static recursive module 680. In Step 907, "NO" is determined because the value of dynamic recursive in 501 is 5. In Step 908, the dynamic recursive module 650 traverses one hop from "O, P, A→D→L→M→O→P, 5." The recursive times judge 652 of the dynamic recursive module 650 outputs a path "P, R, A→D→L→M→O→P→R, 6." In Step 907, "NO" is determined again. In Step 908, the recursive times judge 652 outputs a path "R, U, A→D→L→M→O→P→R, 7." Finally, output data 1022 "A→D→L→M→O→P→R→U, 7" is output.

As a third example, in the case of adding new tuple 1042 (edge), the output of the 4th static recursive execution module and tuple 1014 are joined. The stream data processing server 200 can reduce latency to calculate the result by using temporal store.

In a fourth example, the sliding window only holds 10-minute data, so that some data are cut out from the sliding window. In the case that tuple 1011 is cut out from the sliding window 606, minus tuple 1011 is output from the sliding window 606. The tuple 1011 moves tuple 1012. The join operator 633 in the static recursive module 630 joins outputs of the static recursive module 620 and the tuple 1012. The join operator 633 outputs minus tuple 1013.

In accordance with the method of the first embodiment, there is no need to search all of the paths in a graph every time by the static recursive execution module. The method can decrease maintenance of temporal store by using the dynamic recursive execution module. This can achieve a balance of both memory space and processing cost.

Second Embodiment

In the first embodiment, the judge operator determines whether or not new results are output from the last static recursive module. In the second embodiment, the judge operator makes this determination by not only new results but also the number of paths (path number) which is the number of hops in the path or weight of paths (path weight) which is sum or average of each path (also known as path cost or path length).

Figure 11:
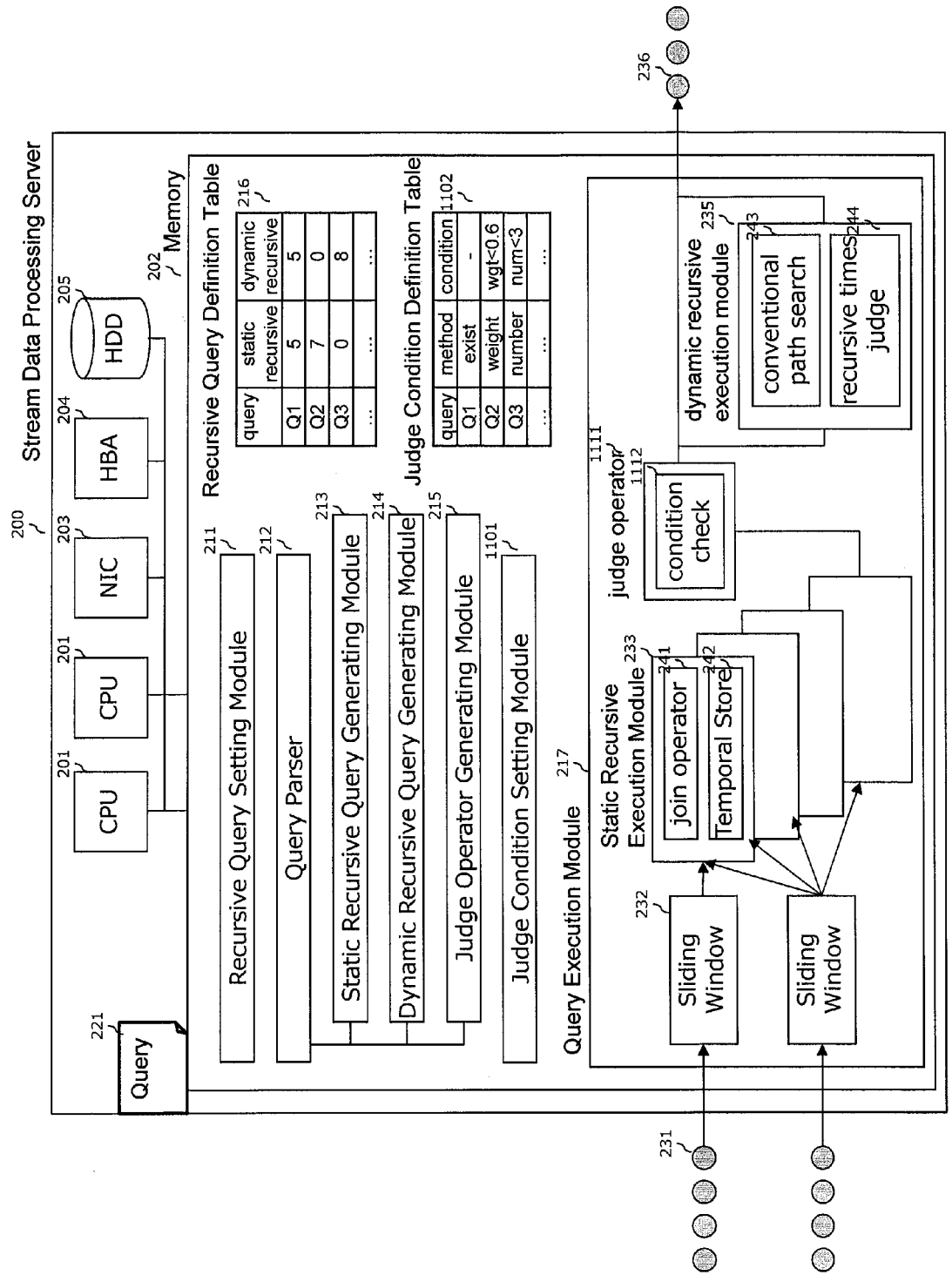
FIG. 11 shows an example of a stream data processing server 200 according to a second embodiment of the present invention.

FIG. 11 shows an example of a stream data processing server 200 according to a second embodiment of the present invention. It is almost the same as that of FIG. 2 (first embodiment), except that a judge condition setting module 1101 and a judge condition definition table 1102 are added, and that a judge operator 1111 having a condition check 1112 replaces the judge operator 234 of FIG. 2. The judge condition setting module 1101 receives a judge condition setting command and updates the judge condition definition table 1102. The judge condition definition table 1102 manages judge method in the judge operator 1111 in each query (see FIG. 12). The condition check 1112 judges execution of the dynamic recursive execution module based on the condition in the judge condition definition table 1102.

FIG. 12. shows an example of a judge condition definition table 1201. It includes a query column 1202, a judge method column 1203, and a judge condition column 1204. It has sample entries 1211-1213. Entry 1211 indicates the same judge method as that of the first embodiment. The condition check 1112 determines whether or not new results are output from the last static recursive module. Entry 1212 indicates that the condition is path weight<0.6. The condition check 1112 determines whether or not the largest weight of new results is less than 0.6. Entry 1213 indicates that the condition is path number<3. The condition check 1112 determines whether or not the number of new results is less than 3.

Figure 13:
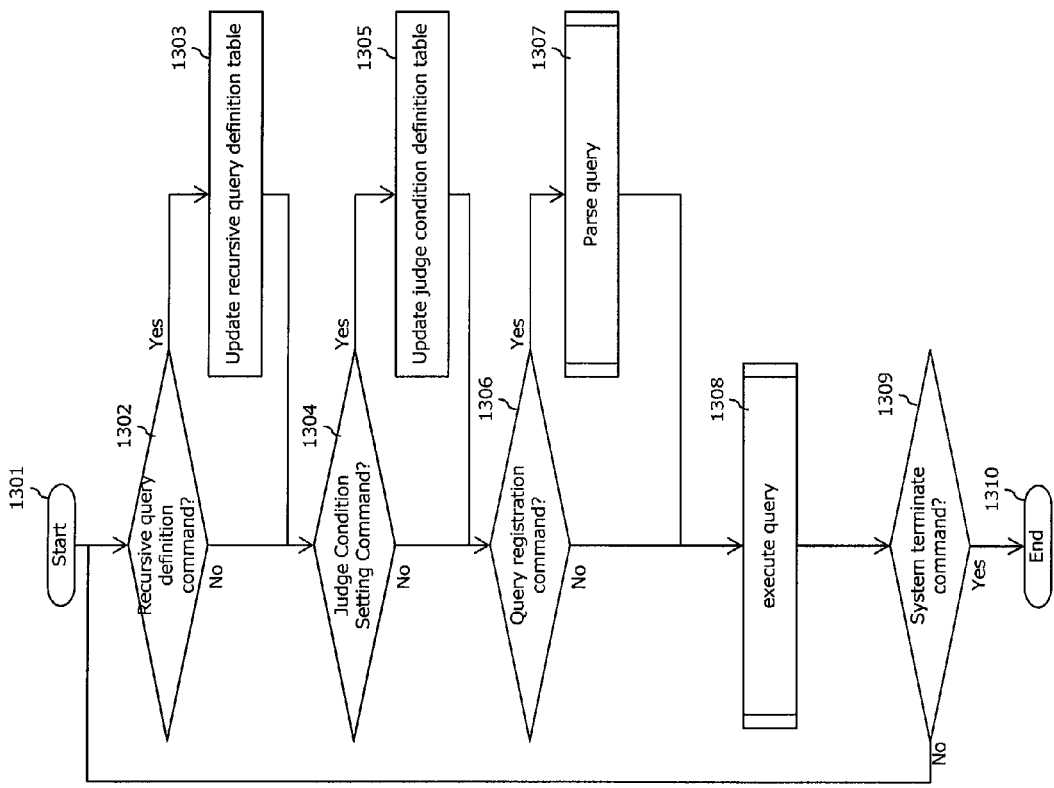
FIG. 13 shows an example of a flow diagram illustrating an overall process performed in the stream data processing system 200 of FIG. 11 according to the second embodiment.

FIG. 13 shows an example of a flow diagram illustrating an overall process performed in the stream data processing system 200 of FIG. 11 according to the second embodiment. Steps 1301-1303 are the same as Steps 701-703 of FIG. 7. Steps 1306-1310 are the same as Steps 704-708 of FIG. 7. In new Step 1304, the judge condition setting module 1101 determines whether or not an input command is a judge condition setting command. If "YES" is determined in Step 1304, the judge condition setting module 1101 updates the judge condition definition table 1102 in new Step 1305.

Figure 14:
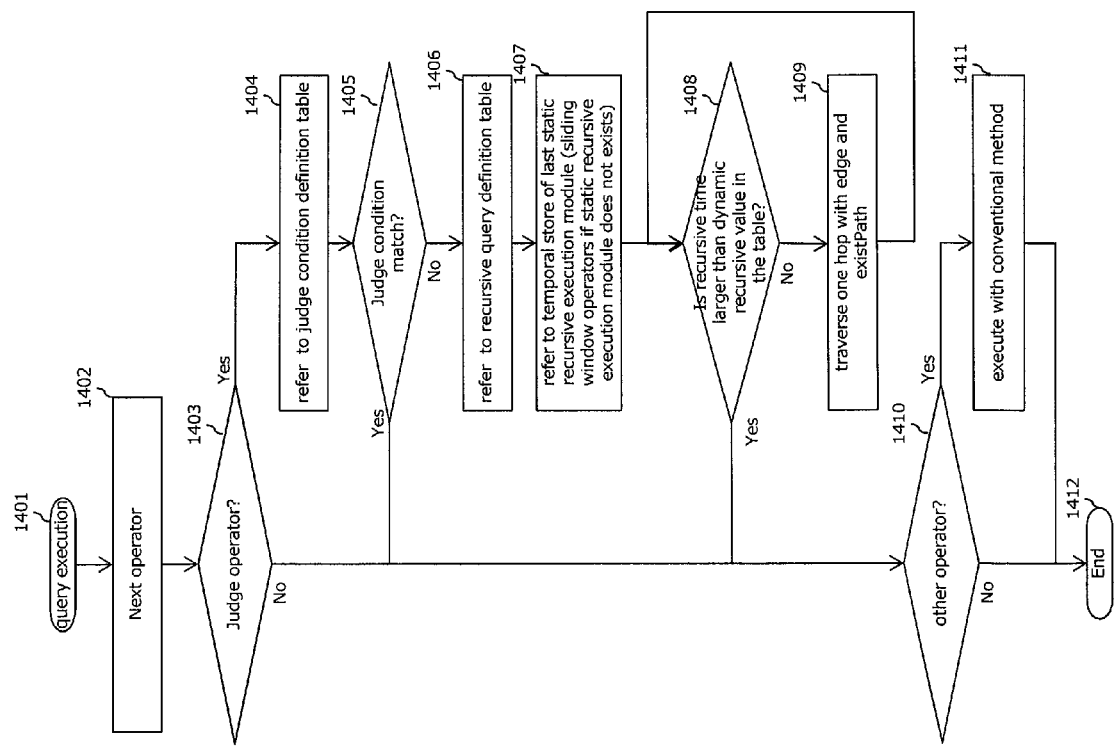
FIG. 14 shows an example of a flow diagram illustrating Step 1308 for executing query in FIG. 13 according to the second embodiment.

FIG. 14 shows an example of a flow diagram illustrating Step 1308 for executing query in FIG. 13 according to the second embodiment. Steps 1401-1403 are the same as Steps 901-903 of FIG. 9. Steps 1406-1412 are the same as Steps 905-911 of FIG. 9. Steps 1404 and 1405 replace step 904 of FIG. 9. In Step 1404, the query execution module 217 refers to the judge condition definition table 1102. In Step 1405, the condition check 1112 determines whether or not new results match the condition in the judge condition definition table 1102.

Third Embodiment

In the first embodiment, the number of static recursive and dynamic recursive is set by user. In the third embodiment, the stream data processing engine adjust the recursive number based on resource monitoring information such as CPU utilization and memory utilization. In the case of using much CPU/memory, the number of static recursive module decreases. CPU/memory utilization will become lower because the query execution module has less temporal store and does less temporal store maintenance (e.g., updating tentative aggregation). On the other hand, in the case of using less CPU/memory, the number of static recursive modules increases. Execution latency will become lower because the query execution module has more temporal store and start calculating with temporal store. In this embodiment, the stream data processing engine can balance CPU/memory utilization and execution latency.

Figure 15:
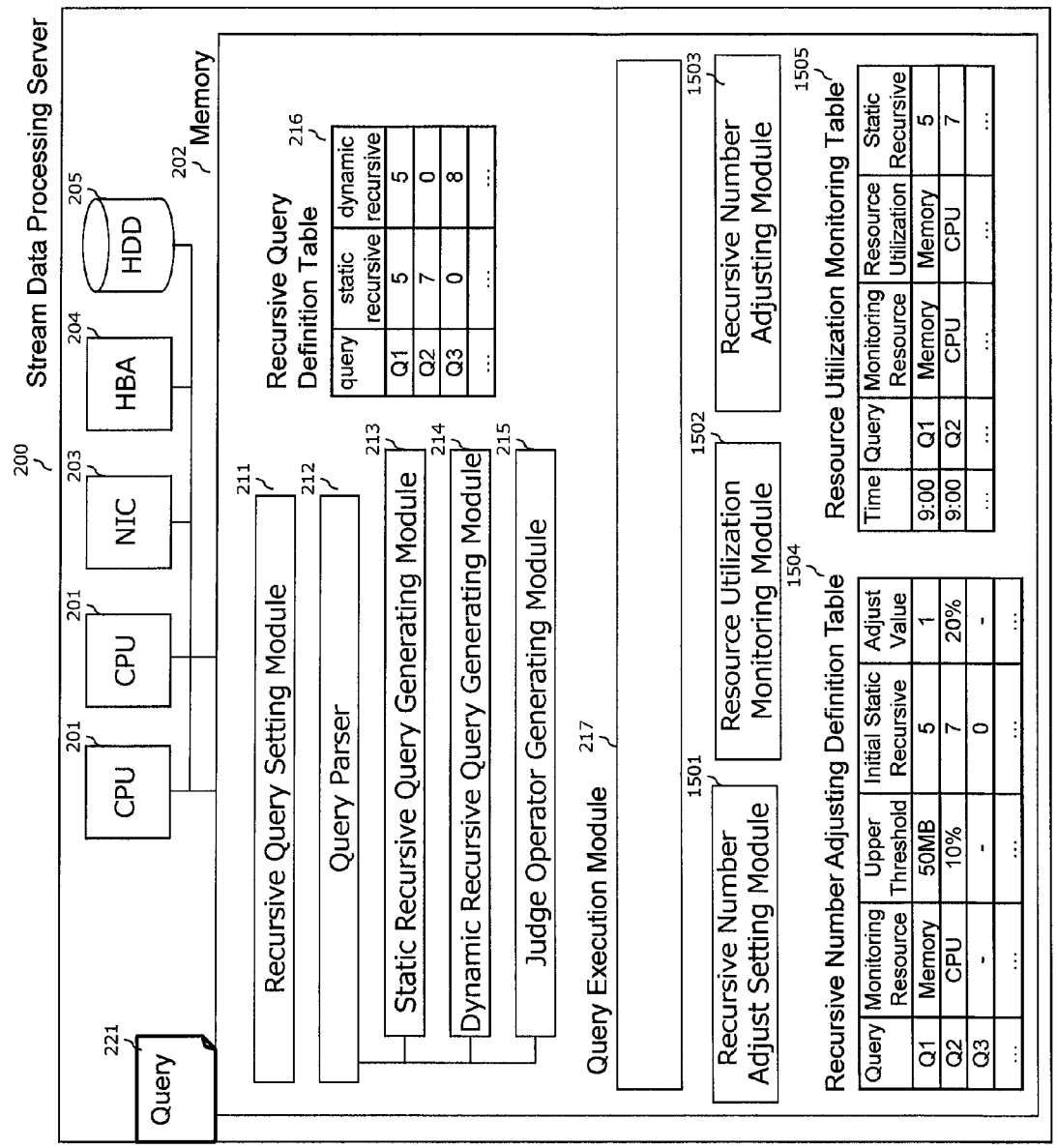
FIG. 15 shows an example of a stream data processing server according to a third embodiment of the present invention.

FIG. 15 shows an example of a stream data processing server 200 according to a third embodiment of the present invention. It is almost the same as that of FIG. 2 (first embodiment). The query execution module 217 is simplified, but still includes elements 231-244. Elements 1501-1505 are newly added in the third embodiment. A recursive number adjust setting module 1501 receives a recursive number adjust setting command and updates a recursive number adjusting definition table 1504. A resource utilization monitoring module 1502 monitors resource utilization such as CPU and memory and updates a resource utilization monitoring table 1505. A recursive number adjusting module 1503 changes the recursive number, updates the resource utilization monitoring table 1505, and modifies the query execution module 217. The recursive number adjusting definition table 1504 manages monitoring resource, threshold information, and adjust value in each query (see FIG. 16). The resource utilization monitoring table 1505 manages resource utilization and the number of static recursive in each time and each query (see FIG. 17).

FIG. 16 shows an example of a recursive number adjusting definition table 1601. The table includes query name column 1602, monitoring resource column 1603, monitoring interval column 1604, upper threshold column 1605, lower threshold column 1606, initial static recursive column 1607, adjust method column 1608, and adjust value column 1609. It has entries 1611-1613. Entry 1611 indicates that if memory utilization is larger than 50 MB, the recursive number adjust setting module 1501 will decrease 1 from the current number of static recursive, and if memory utilization is less than 30 MB, the recursive number adjust setting module 1501 will increase 1 from the current number of static recursive. Entry 1612 indicates that if CPU utilization is larger than 10%, the recursive number adjust setting module 1501 will decrease 20% from the current number of static recursive, and if CPU utilization is less than 5%, the recursive number adjust setting module 1501 will increase 20% from the current number of static recursive. Entry 1613 indicates no adjustment is needed.

FIG. 17 shows an example of a resource utilization monitoring table 1701. The table includes time column 1702, query column 1703, monitoring resource column 1704, resource utilization column 1705, and static recursive column 1706. It has entries 1711-1716. Entry 1711 indicates memory utilization at 9:00 is 55 MB and the number of static recursive is 5. Entry 1713 indicates memory utilization at 9:10 is 28 MB and the number of static recursive is 4 (decrease 1 from the current number 5).

Figure 18:
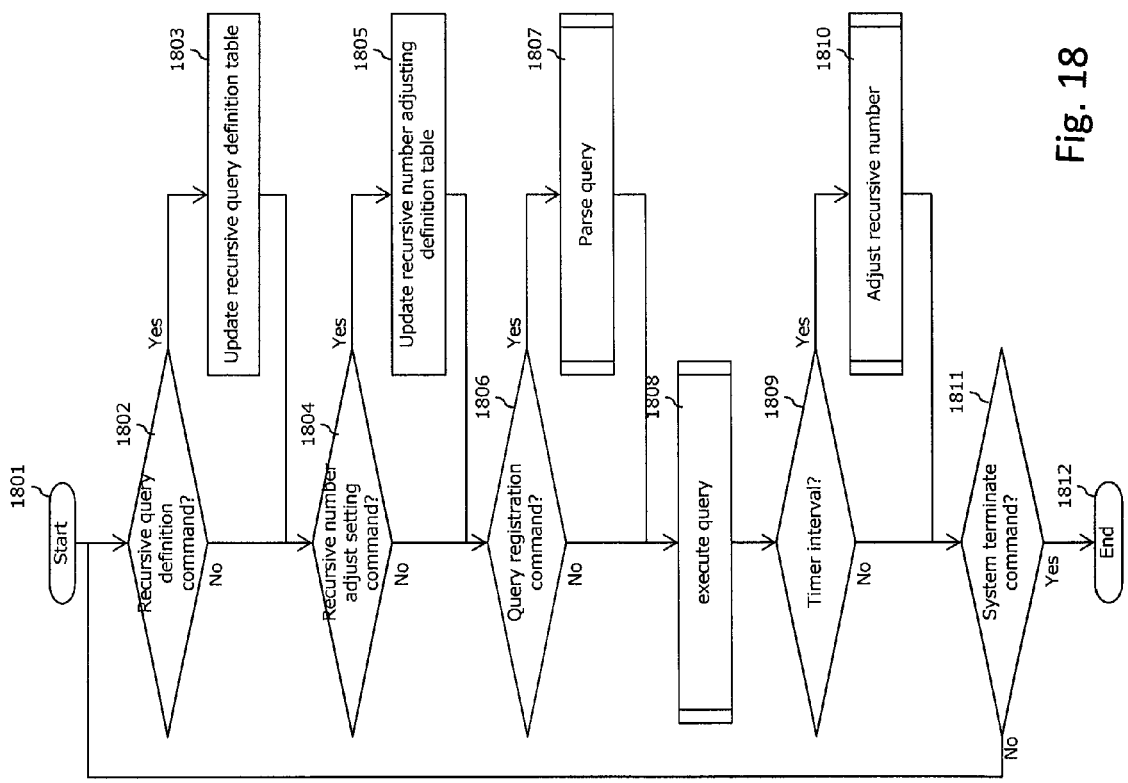
FIG. 18 shows an example of a flow diagram illustrating an overall process performed in the stream data processing system of FIG. 15 according to the second embodiment.

FIG. 18 shows an example of a flow diagram illustrating an overall process performed in the stream data processing system 200 of FIG. 15 according to the second embodiment. Steps 1801-1803 are the same as Steps 701-703 of FIG. 7. Steps 1806-1808 are the same as Steps 704-706 of FIG. 7. Steps 1811 and 1812 are the same as Steps 707 and 708 of FIG. 7. Steps 1804-1805 and 1809-1810 are newly added. In step 1804, the recursive number adjust setting module 1501 determines whether or not an input command is a recursive number adjust setting command. If "YES" is determined in Step 1804, the recursive number adjust setting module 1501 updates the recursive number adjusting definition table 1504 (Step 1805). In Step 1809, the resource utilization monitoring module 1502 determines whether or not timer event of monitoring resources has occurred. If "YES" is determined in Step 1809, the recursive number adjusting module 1503 adjusts the recursive number (Step 1810) (see FIG. 19).

Figure 19:
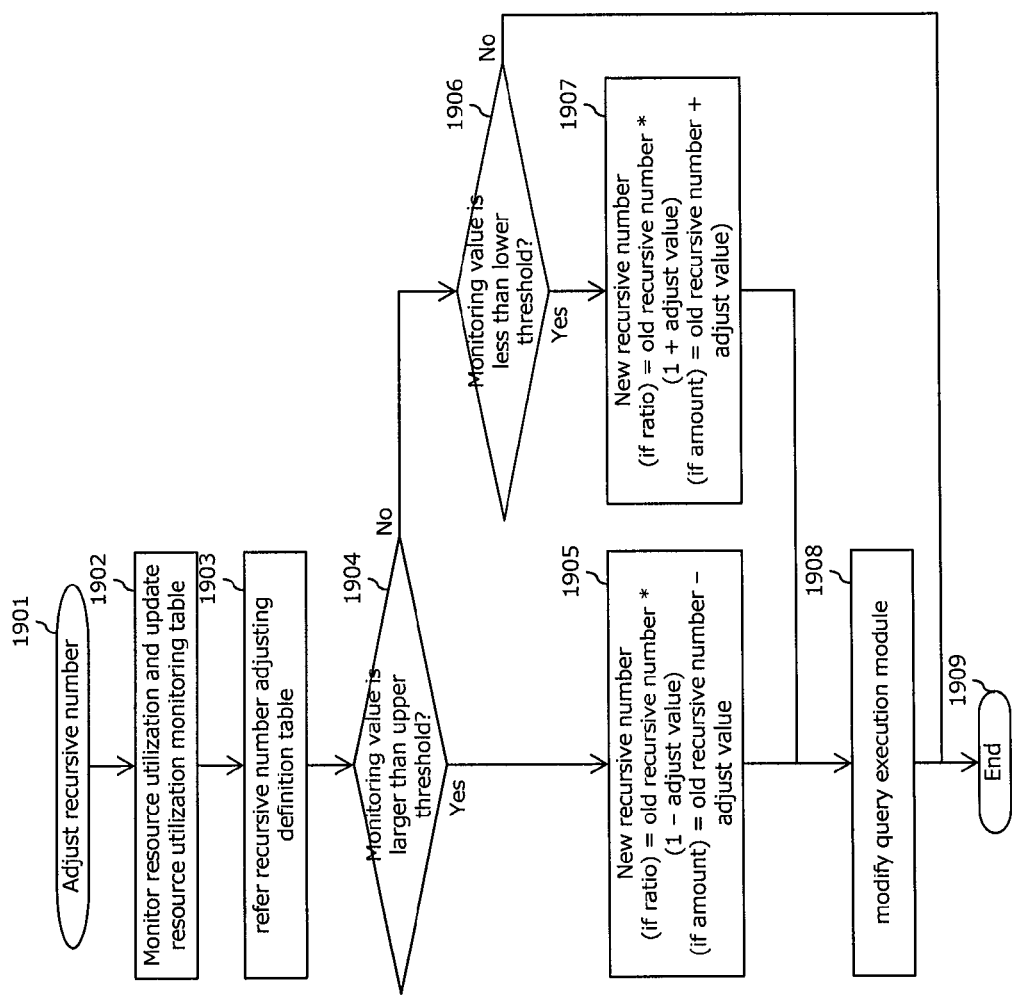
FIG. 19 shows an example of a flow diagram illustrating in detail Step 1810 of FIG. 18 to adjust the recursive number.

FIG. 19 shows an example of a flow diagram illustrating in detail Step 1810 of FIG. 18 to adjust the recursive number. The process starts at Step 1901. The resource utilization monitoring module 1502 monitors the resource utilization and updates the resource utilization monitoring table 1505 (Step 1902). The recursive number adjusting module 1503 refers to the resource utilization monitoring table 1505 (Step 1903), and determines whether or not the monitoring value is larger than an upper threshold (Step 1904). If "YES" is determined in Step 1904, the recursive number adjusting module 1503 sets a new recursive number as old recursive number*(1−adjust value) if the value of 1608 is a ratio, and as old recursive number−adjust value if the value of 1608 is a preset amount (Step 1905). If "NO" is determined in Step 1904, the recursive number adjusting module 1503 determines whether or not the monitoring value is less than a lower threshold (Step 1906). If "YES" is determined in Step 1906, the recursive number adjusting module 1503 sets a new recursive number as old recursive number*(1+adjust value) if the value of 1608 is a ratio, and as old recursive number+adjust value if the value of 1608 is a preset amount (Step 1907). After Step 1905 or after Step 1907, the recursive number adjusting module 1503 modifies the query execution module 217 (Step 1908).

In one example for adjusting the recursive number, at 9:00, a timer interval event has occurred in Step 1809. The recursive number adjust setting module 1501 updates the recursive number adjusting definition table 1504 as provided in entry 1711 of FIG. 17 in Step 1902. Entry 1711 indicates that memory utilization is 55 MB. In Step 1904, "YES" is determined because the current memory utilization 55 MB is larger than the upper threshold of 50 MB. In Step 1905, a new recursive number is calculated as old recursive number 5−adjust value 1=4. In Step 1908, the number of static recursive in the query execution module 217 is modified from 5 into 4 in next 10 minutes.

In another example, at 9:10, a timer interval event has occurred in Step 1809. The recursive number adjust setting module 1501 updates the recursive number adjusting definition table 1504 as provided in entry 1713 of FIG. 17 in Step 1902. Entry 1713 indicates that memory utilization is 28 MB. In Step 1904, "NO" is determined because the current memory utilization 28 MB is not larger than the upper threshold of 50 MB. In Step 1906, "YES" is determined because the current memory utilization 28 MB is less than the lower threshold of 30 MB. In Step 1907, a new recursive number is calculated as old recursive number 4+adjust value 1=5. In Step 1908, the number of static recursive in the query execution module 217 is modified from 4 into 5 in next 10 minutes.

The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable, media for stream data processing on recursive queries of graph data. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A stream data processing computer comprising:
a processor;
a query execution module to receive an input stream of stream data, manage execution order of operators for executing a query, and output an output stream of stream data, the operators including static recursive execution modules using recursive approach, a judge operator, and a dynamic recursive execution module using recursive approach; and
a memory including a temporal store to store data generated in executing the query;
wherein the static recursive execution modules are configured to conduct a recursive number of static recursive execution of the query;
wherein the judge operator is configured to determine whether a preset condition is met after the recursive number of static recursive execution of the query;
wherein the preset condition is met if the static recursive execution modules generate a new result which is different from a previous result, after the recursive number of static recursive execution of the query;
wherein the dynamic recursive execution module is configured, if the preset condition is not met, to continue execution of the query by dynamic recursive execution from a last result of a last static recursive execution module of the static recursive execution modules, for a recursive times equal to a dynamic recursive value, and a result of the dynamic recursive execution is a query execution output;
wherein, if the preset condition is met, the dynamic recursive execution module does not continue execution of the query by dynamic recursive execution from a last result of a last static recursive execution module of the static recursive execution modules, and the last result of the last static recursive execution module is the query execution output; and
wherein the static recursive execution modules are arranged in series, with an output of one static recursive execution module being directed as an input to a next static recursive execution module in the series and with an output of a last static recursive execution module being directed as an input to the judge operator, which directs the last result of the last static recursive execution module of the static recursive execution modules as input to the dynamic recursive execution module if the preset condition is not met, to continue execution of the query by dynamic recursive execution for a recursive times equal to a dynamic recursive value, and which bypasses the dynamic recursive execution module if the preset condition is met.

2. The stream data processing computer according to claim 1, further comprising:
a query parser which calls a static recursive query generating module in the memory to generate a number of the static recursive execution modules corresponding to the recursive number of static recursive execution of the query, a judge operator generating module in the memory to generate the judge operator; and a dynamic recursive query generating module in the memory to generate the dynamic recursive execution module, in an execution tree.

3. The stream data processing computer according to claim 2,
wherein the query parser is configured to generate, based on the input stream and by parsing the query, the execution tree which includes an input tuple set of multiple streams;
wherein the operators include sliding window operators each cutting out data rows from the multiple streams by specifying a time interval for cutting out data rows;
wherein the static recursive execution modules are placed after the sliding window operators for the multiple streams;
wherein the judge operator is placed after the last static recursive execution module;
wherein the dynamic recursive execution module is placed after the judge operator.

4. The stream data processing computer according to claim 1,
wherein the dynamic recursive execution module includes a recursive times judge to judge whether to perform a recursive number of dynamic recursive execution of the query from the last result of the last static recursive execution module, based on the dynamic recursive value and a recursive times of dynamic recursive execution.

5. The stream data processing computer according to claim 1,
wherein the preset condition further relates to at least one of path weight or path number.

6. The stream data processing computer according to claim 1,
wherein the recursive number of static recursive execution of the query and the dynamic recursive value are preset.

7. The stream data processing computer according to claim 1, further comprising:
a resource utilization monitoring module to monitor resource utilization of the stream data processing computer; and
a recursive number adjusting module to change at least one of the recursive number of static recursive execution of the query or the dynamic recursive value, based on the monitored resource utilization.

8. The stream data processing computer according to claim 7, further comprising:
a recursive number adjust setting module to update a recursive number adjusting definition table based on a recursive number adjust setting command;
wherein the resource utilization monitoring module is configured to monitor resource utilization of the stream data processing computer based on the recursive number adjusting definition table; and
wherein the recursive number adjusting module is configured to change at least one of the recursive number of static recursive execution of the query or the dynamic recursive value, based on the monitored resource utilization and the recursive number adjusting definition table.

9. A non-transitory computer-readable storage medium storing a plurality of instructions for controlling a data processor to perform stream data processing that receives stream data input information as primary information and generates secondary information by acquiring primary information within a predetermined period from among the received primary information, in a stream data processing computer which includes a memory having a temporal store, the plurality of instructions comprising:
instructions that cause the data processor to receive an input stream of stream data, manage execution order of operators for executing a query, and output an output stream of stream data, the operators including static recursive execution modules using recursive approach, a judge operator, and a dynamic recursive execution module using recursive approach;

instructions that cause the data processor to store in the temporal store data generated in executing the query;

instructions that cause the static recursive execution modules to conduct a recursive number of static recursive execution of the query;

instructions that cause the judge operator to determine whether a preset condition is met after the recursive number of static recursive execution of the query;

wherein the preset condition is met if the static recursive execution modules generate a new result which is different from a previous result, after the recursive number of static recursive execution of the query;

instructions that cause the dynamic recursive execution module, if the preset condition is not met, to continue execution of the query by dynamic recursive execution from a last result of a last static recursive execution module of the static recursive execution modules, for a recursive times equal to a dynamic recursive value, and a result of the dynamic recursive execution is a query execution output;

wherein, if the preset condition is met, the dynamic recursive execution module does not continue execution of the query by dynamic recursive execution from a last result of a last static recursive execution module of the static recursive execution modules, and the last result of the last static recursive execution module is the query execution output;

wherein the static recursive execution modules are arranged in series, with an output of one static recursive execution module being directed as an input to a next static recursive execution module in the series and with an output of a last static recursive execution module being directed as an input to the judge operator; and instructions that cause the judge operator to direct the last result of the last static recursive execution module of the static recursive execution modules as input to the dynamic recursive execution module if the preset condition is not met, to continue execution of the query by dynamic recursive execution for a recursive times equal to a dynamic recursive value, and to bypass the dynamic recursive execution module if the preset condition is met.

10. The non-transitory computer-readable storage medium according to claim 9, wherein the plurality of instructions further comprise:

instructions that cause the data processor to generate a number of the static recursive execution modules corresponding to the recursive number of static recursive execution of the query, in an execution tree;

instructions that cause the data processor to generate the judge operator in the execution tree; and instructions that cause the data processor to generate the dynamic recursive execution module in the execution tree.

11. The non-transitory computer-readable storage medium according to claim 10, wherein the plurality of instructions further comprise:

instructions that cause the data processor to generate, based on the input stream and by parsing the query, the execution tree which includes an input tuple set of multiple streams, wherein the operators include sliding window operators each cutting out data rows from the multiple streams by specifying a time interval for cutting out data rows;

instructions that cause the data processor to place the static recursive execution modules after the sliding window operators for the multiple streams;

instructions that cause the data processor to place the judge operator after the last static recursive execution module; and instructions that cause the data processor to place the dynamic recursive execution module after the judge operator.

12. The non-transitory computer-readable storage medium according to claim 9, wherein the instructions that cause the dynamic recursive execution module, if the preset condition is not met, to continue execution of the query by dynamic recursive execution comprise:

instructions that cause the dynamic recursive execution module to judge whether to perform a recursive number of dynamic recursive execution of the query from the last result of the last static recursive execution module, based on the dynamic recursive value and a recursive times of dynamic recursive execution.

13. The non-transitory computer-readable storage medium according to claim 9, wherein the preset condition further relates to at least one of path weight or path number.

14. The non-transitory computer-readable storage medium according to claim 9, wherein the recursive number of static recursive execution of the query and the dynamic recursive value are preset.

15. The non-transitory computer-readable storage medium according to claim 9, wherein the plurality of instructions further comprise:

instructions that cause the data processor to monitor resource utilization of the stream data processing computer; and instructions that cause the data processor to change at least one of the recursive number of static recursive execution of the query or the dynamic recursive value, based on the monitored resource utilization.

16. The non-transitory computer-readable storage medium according to claim 15, wherein the plurality of instructions further comprise:

instructions that cause the data processor to update a recursive number adjusting definition table based on a recursive number adjust setting command;

instructions that cause the data processor to monitor resource utilization of the stream data processing computer based on the recursive number adjusting definition table; and instructions that cause the data processor to change at least one of the recursive number of static recursive execution of the query or the dynamic recursive value, based on the monitored resource utilization and the recursive number adjusting definition table.

17. A stream data processing computer comprising:

a processor;

a query execution module to receive an input stream of stream data, manage execution order of operators for executing a query to process the stream data, and output an output stream of stream data, the operators including static recursive execution modules using recursive approach, a judge operator, and a dynamic recursive execution module using recursive approach; and a memory including a temporal store to store data generated in executing the query;

wherein the static recursive execution modules are configured to conduct a recursive number of static recursive execution of the query;

wherein the judge operator is configured to determine whether a preset condition is met after the recursive number of static recursive execution of the query;

wherein the dynamic recursive execution module is configured, if the preset condition is not met, to continue execution of the query by dynamic recursive execution from a last result of a last static recursive execution module of the static recursive execution modules, for a recursive times equal to a dynamic recursive value, and a result of the dynamic recursive execution is a query execution output;

wherein, if the preset condition is met, the dynamic recursive execution module does not continue execution of the query by dynamic recursive execution from a last result of a last static recursive execution module of the static recursive execution modules, and the last result of the last static recursive execution module is the query execution output; and wherein the static recursive execution modules are arranged in series, with an output of one static recursive execution module being directed as an input to a next static recursive execution module in the series and with an output of a last static recursive execution module being directed as an input to the judge operator, which directs the last result of the last static recursive execution module of the static recursive execution modules as input to the dynamic recursive execution module if the preset condition is not met, to continue execution of the query by dynamic recursive execution for a recursive times equal to a dynamic recursive value, and which bypasses the dynamic recursive execution module if the preset condition is met.

18. The stream data processing computer according to claim 17, wherein the query execution module is configured to execute recursive queries of graph data;

wherein the stream data includes a path stream of path information to search and an edge stream of edge information in graph; and wherein the path stream and the edge stream are inputted to the static recursive execution modules.

19. The stream data processing computer according to claim 18, wherein the stream data includes a node stream of node information in graph, which is joined with an output of the dynamic recursive execution module if the preset condition is not met or joined with an output of the last static recursive execution module if the preset condition is met.

20. The stream data processing computer according to claim 17, wherein the preset condition further relates to at least one of path weight or path number.

* * * * *